United States Patent
Yatsu et al.

(10) Patent No.: US 6,945,651 B2
(45) Date of Patent: *Sep. 20, 2005

(54) OPTICAL UNIT AND PROJECTION TYPE PROJECTOR APPARATUS USING THE SAME

(75) Inventors: Masahiko Yatsu, Tokyo (JP); Koji Hirata, Tokyo (JP); Futoshi Yamasaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/993,945

(22) Filed: Nov. 18, 2004

(65) Prior Publication Data

US 2005/0073652 A1 Apr. 7, 2005

Related U.S. Application Data

(63) Continuation of application No. 10/356,000, filed on Jan. 31, 2003, now Pat. No. 6,832,836.

(30) Foreign Application Priority Data

Feb. 26, 2002 (JP) ........................................ 2002-048938

(51) Int. Cl.[7] .............................................. G03B 21/14
(52) U.S. Cl. ..................................................... 353/20
(58) Field of Search ............................. 353/20, 31, 34, 353/37; 349/5, 7, 8, 9

(56) References Cited

U.S. PATENT DOCUMENTS

| | | | | |
|---|---|---|---|---|
| 5,130,826 A | * | 7/1992 | Takanashi et al. | 349/9 |
| 6,331,879 B1 | * | 12/2001 | Sawai et al. | 349/9 |
| 6,486,997 B1 | * | 11/2002 | Bruzzone et al. | 359/247 |
| 6,832,836 B2 | * | 12/2004 | Yatsu et al. | 353/20 |

* cited by examiner

*Primary Examiner*—William C. Dowling
(74) *Attorney, Agent, or Firm*—Townsend and Townsend and Crew LLP

(57) ABSTRACT

By making the beam polarization state in a cross prism having a dichroic function for an incident beam on a reflection type liquid crystal panel the same as that for a reflected ON beam, a small-sized, low cost projection type projector apparatus is provided. A Faraday rotator having a Faraday rotation angle of 45 degrees is disposed on an optical path between a PBS and a cross prism. A half-wave plate having such a polarization axis as to rotate a polarization angle of linearly polarized light by 45 or 135 degrees is disposed on an optical immediately before or behind the Faraday rotator.

11 Claims, 12 Drawing Sheets

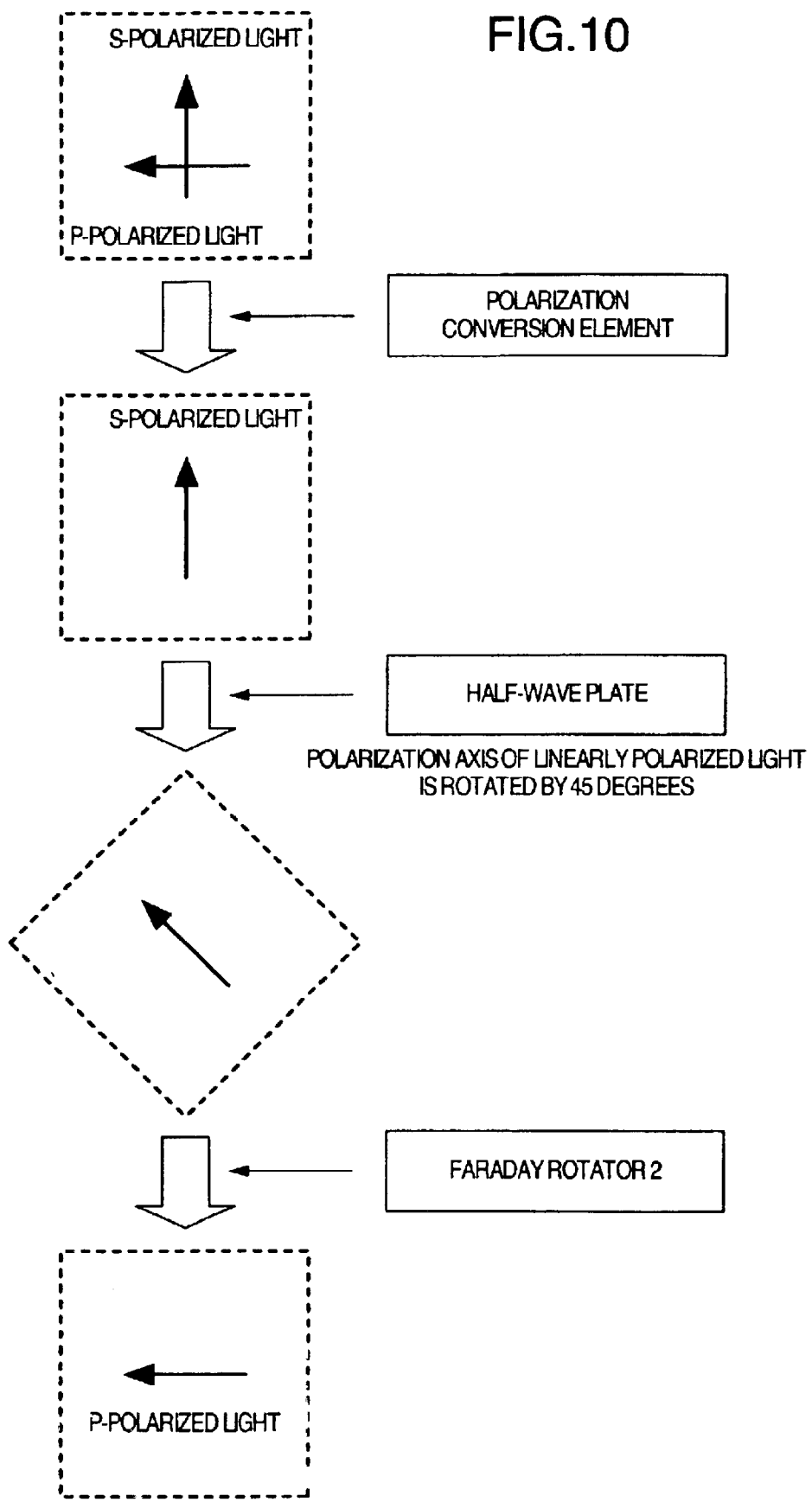

OPTICAL UNIT AND PROJECTION TYPE PROJECTOR APPARATUS USING THE SAME

CROSS-REFERENCE TO RELATED APPLICATIONS

This application is a continuation application of U.S. patent application Ser. No. 10/356,000, filed Jan. 31, 2003, now U.S. Pat. No. 6,832,836, and titled "Optical Unit and Projection Type Projector Apparatus Using the Same," which is related to and claims priority from Japanese Patent Application 2002-048938, filed Feb. 26, 2002, and is herein incorporated by reference for all purposes.

BACKGROUND OF THE INVENTION

The present invention relates to a projection type projector apparatus using a reflection type liquid crystal panel, such as a so-called liquid crystal projector or projection type television using forward projection.

Liquid crystal projectors for business use have widely spread. Furthermore, as a substitute for a conventional image display apparatus of such a scheme that an image displayed on a cathode-ray tube is projected onto a screen, development of a projection type television using liquid crystal display elements has been conducted.

Liquid crystal panels are classified into transmission type crystal panels and reflection type crystal panels, according to their types. In the reflection type liquid crystal panels, a beam passes through a liquid crystal layer twice and consequently the thickness of the liquid crystal layer can be reduced by that amount as compared with the transmission type liquid crystal panels. As a result, the reflection type liquid crystal panels are excellent in fast response performance, and consequently they are suitable for dynamic picture display, i.e., application of projection type television.

On the other hand, in the transmission type liquid crystal panels, the so-called ON state and OFF state are generated by a shutter operation of the liquid crystal itself. In the case of the reflection type liquid crystal panels, both a beam in the ON state and a beam flux in the OFF state are reflected on the same optical path, and consequently a polarization beam splitter (hereafter abbreviated to PBS) for conducting beam separation on the basis of a difference in polarization state becomes an indispensable component.

The PBS action on a reflection type liquid crystal panel will now be described by using FIG. 12. In FIG. 12, reference numeral 1 denotes a PBS, 5 a cross prism for performing dichroic action, and 6 a reflection type liquid crystal panel. In FIG. 12, if light aligned with S-polarized light in an illumination optical system or only S-polarized light in the illumination optical system is input to the PBS 1, then the S-polarized light is reflected by a PBS plane of the PBS 1 and input to the cross prism 5. White light incident on the cross prism 5 is separated into three colors R, G and B by the dichroic action. The R, G and B colored beams are input to the reflection type liquid crystal panels 6 respectively corresponding to R, G and B. If each pixel is in the ON state in FIG. 12, then each of the beams input to the reflection type liquid crystal panels 6 respectively corresponding to R, G and B is converted in polarization state from S-polarized light to P-polarized light, and reflected. On the other hand, if each pixel is in the OFF state, then each beam is reflected while it is still S-polarized light. Beams of R, G and B input to the cross prism 5 again are subjected to color synthesis by the cross prism 5. As for beams incident on the PBS 1, each of beams in the ON state is a P-polarized beam and consequently it is transmitted through the PBS 1 this time, input to a projection lens (not illustrated), and projected. On the other hand, each of beams in the OFF state remains an S-polarized beam and consequently it is reflected by the PBS 1 again, and returned to its original light source side.

SUMMARY OF THE INVENTION

In a conventional reflection type liquid crystal display apparatus, it is necessary in the reflection type liquid crystal panel 6, which reflects both the ON beam and the OFF beam, to convert the polarization state of the ON beam from the S-polarized light to the P-polarized light, as described above. This holds true even if the S-polarized light and the P-polarized light are replaced with each other.

As for the polarization state of light that passes through the cross prism 5, therefore, for example, it is S-polarized light before it is reflected by the reflection type liquid crystal panel 6 and it is P-polarized light after it has been reflected by the reflection type liquid crystal panel 6. In the case where the cross prism 5 is used with S-polarized light and P-polarized light for the same wavelength, the wavelength characteristic in S-polarized light differs from that in P-polarized light. As a result, fine spectral transmission factor performance cannot be obtained. For example, desired image light of each color output from each reflection type liquid crystal panel 6 is not output from the cross prism 5.

Over against this problem, there has been proposed a scheme of separating one color from the white color by using a dichroic prism or a dichroic filter, converting a polarization state of one of two colors, and conducting color separation and synthesis by using the PBS. In this scheme, a total of three PBSs and one dichroic prism or dichroic filter are needed. Thus, this scheme is disadvantageous in size, weight and cost.

An object of the present invention is to make a polarization state of a beam incident on a reflection type liquid crystal panel the same as a polarized state of a reflected ON beam supplied from the reflection type liquid crystal panel in a configuration using a cross prism having a dichroic function and the reflection type liquid crystal panel, and thereby provide a small-sized, light-weighted, low cost illumination apparatus, and a projection type projector apparatus using the illumination apparatus.

In an optical unit including a light source, a polarization beam splitter, a color separation and synthesis unit having a dichroic function, and reflection type liquid crystal panels, a Faraday rotator is disposed on an optical path between the polarization beam splitter and the cross prism, and a polarization direction of a beam that passes through the Faraday rotator is rotated by a predetermined angle.

Other objects, features and advantages of the invention will become apparent from the following description of the embodiments of the invention taken in conjunction with the accompanying drawings.

BRIEF DESCRIPTION OF THE DRAWINGS

FIG. 10 is a diagram showing relations among polarization axes of a polarization conversion element, a PBS, and a cross prism in a third embodiment of the present invention;

DETAILED DESCRIPTION OF EMBODIMENTS

Hereafter, embodiments of the present invention will be described with reference to FIGS. 1 to 11B.

Figure 1:
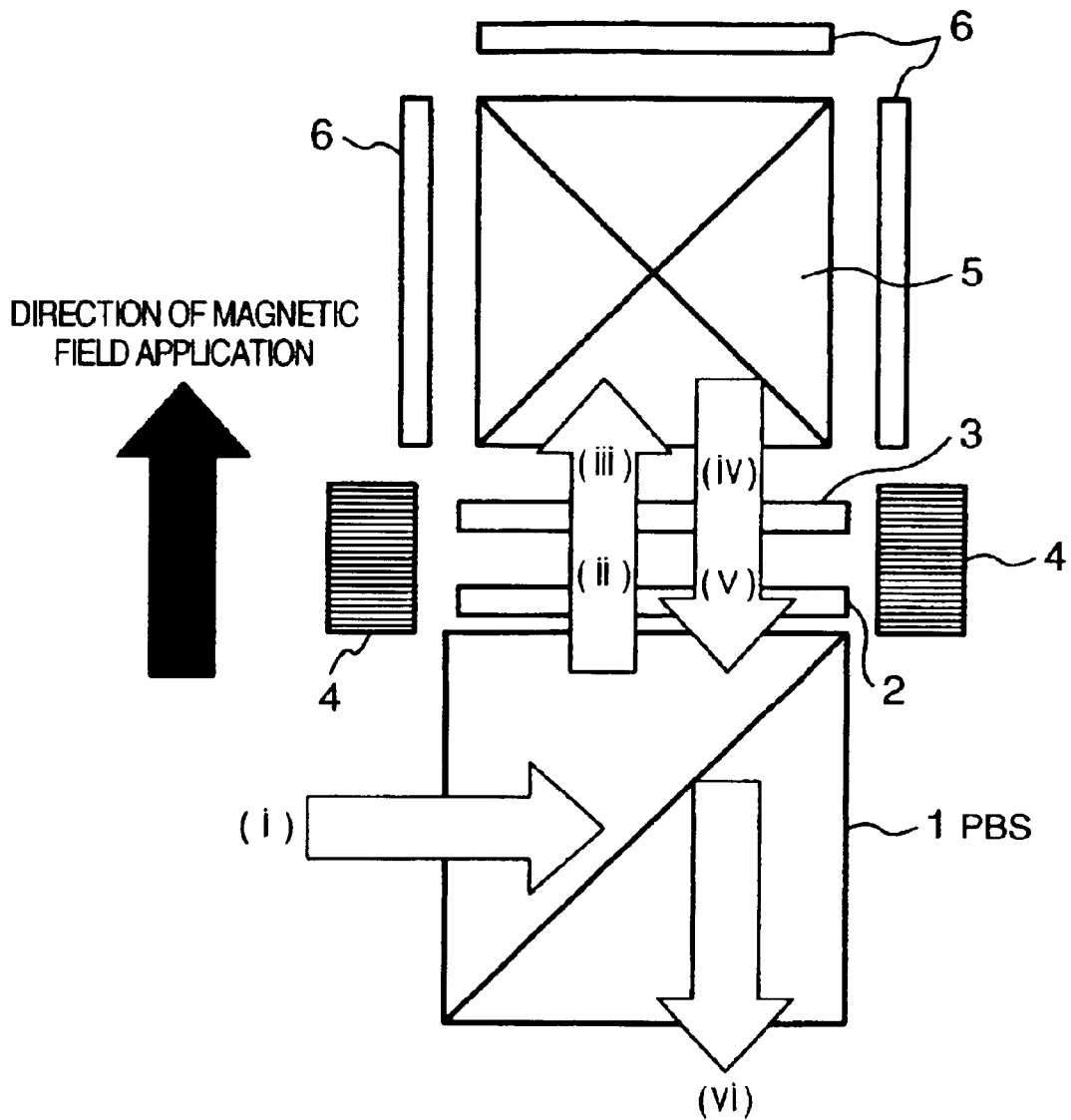
FIG. 1 is a configuration diagram of a color separation and synthesis section in a first embodiment of the present invention.
Figure 2A:
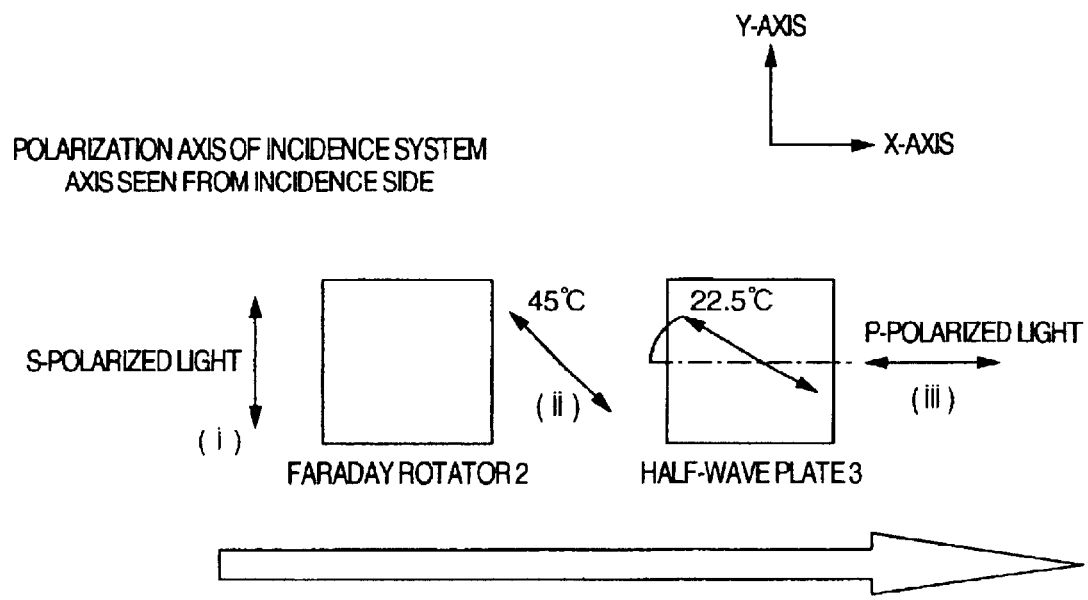
FIGS. 2A and 2B are diagrams of a polarization axis of a color separation and synthesis section in a first embodiment of the present invention.
Figure 2B:
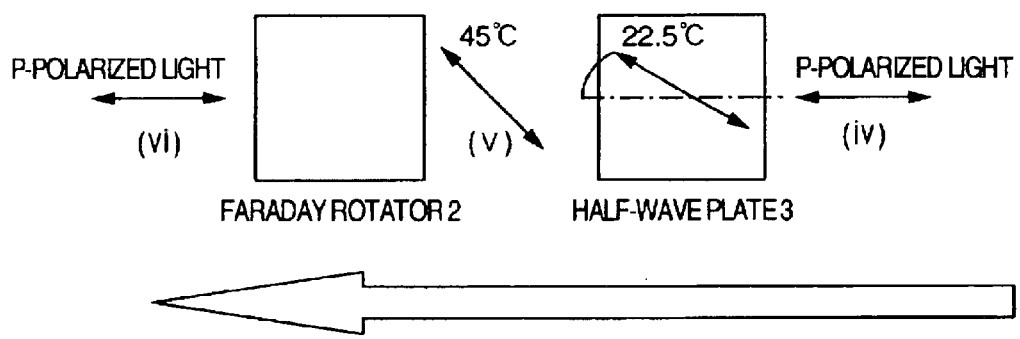
Figure 3:
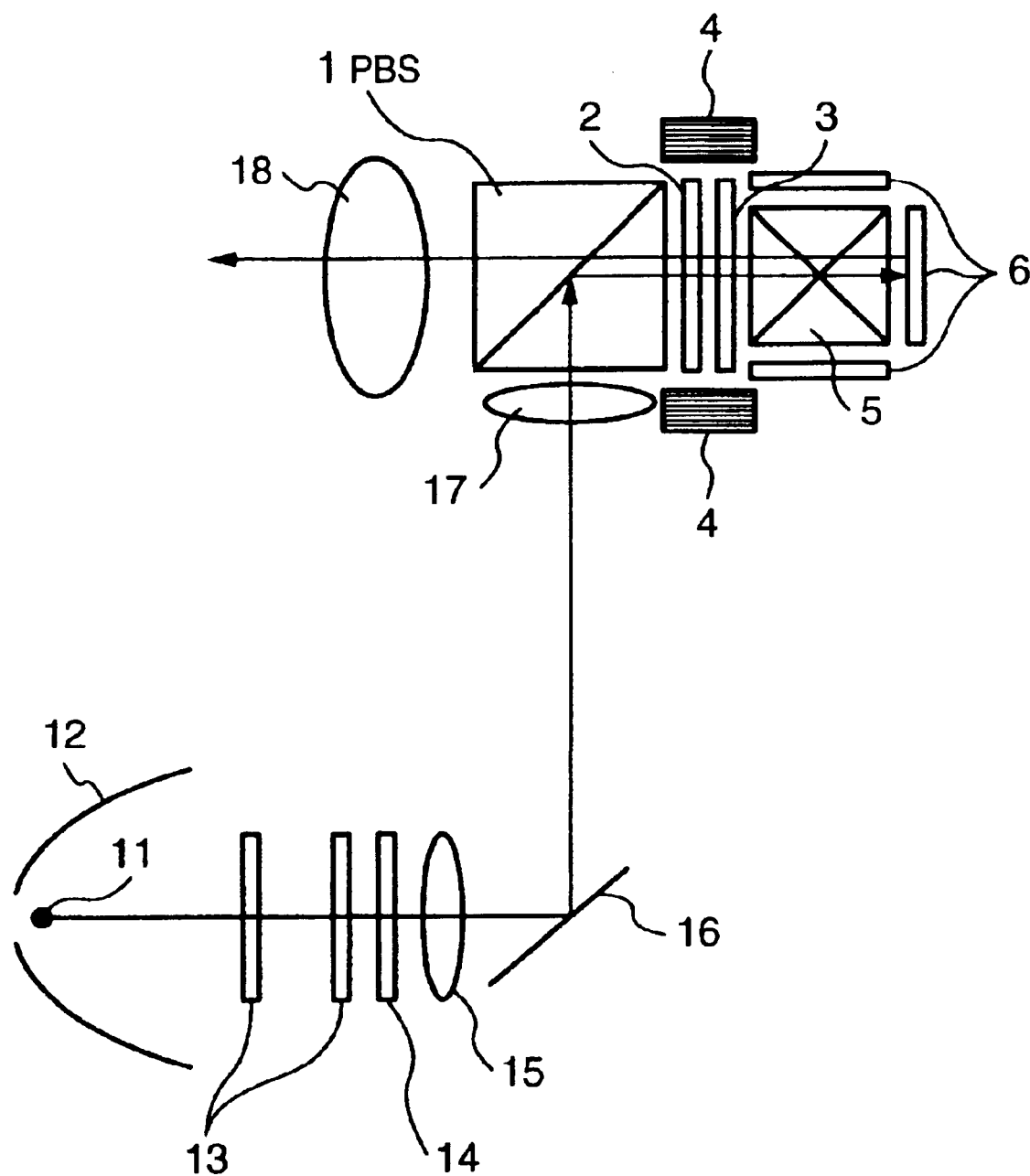
FIG. 3 is a diagram showing a general configuration of an optical system of a projection type projector apparatus using a color separation and synthesis section in a first embodiment of the present invention.

FIGS. 1, 2A, 2B and 3 are diagrams of a first embodiment of the present invention. FIG. 1 is a basic configuration diagram of a color separation and synthesis section included in a projection type projector apparatus. FIGS. 2A and 2B are diagrams showing details of polarization states of a beam. FIG. 3 is a diagram showing a general configuration of an optical system of a projection type projector apparatus using a color separation and synthesis section shown in FIG. 1.

In FIG. 1, reference numeral 1 denotes a PBS having a function of reflecting S-polarized light and transmitting P-polarized light and making it go straight on. Numeral 2 denotes a Faraday rotator including a garnet crystal plate. Numeral 3 denotes a half-wave plate having a polarization axis for rotating incident linearly polarized light by 45 degrees. Numeral 4 denotes a magnet for providing the Faraday rotator with a constant direction of magnetic field application, 5 a cross prism having a dichroic function, and 6 a reflection type liquid crystal panel.

First, the function of the Faraday rotator 2 will now be described with reference to FIGS. 11A and 11B.

Figure 11A:
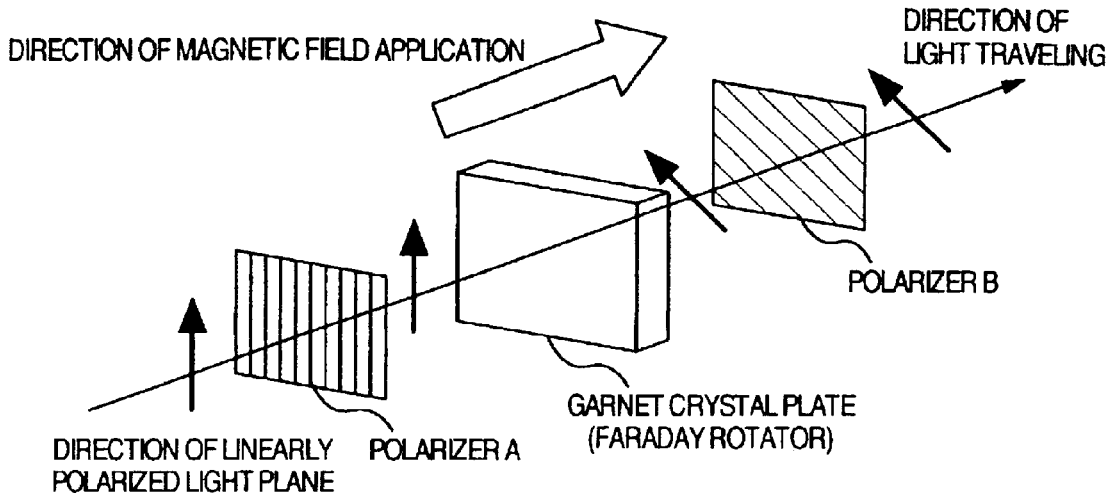
FIGS. 11A and 11B are diagrams showing a function of a Faraday rotator used in the present invention.
Figure 11B:
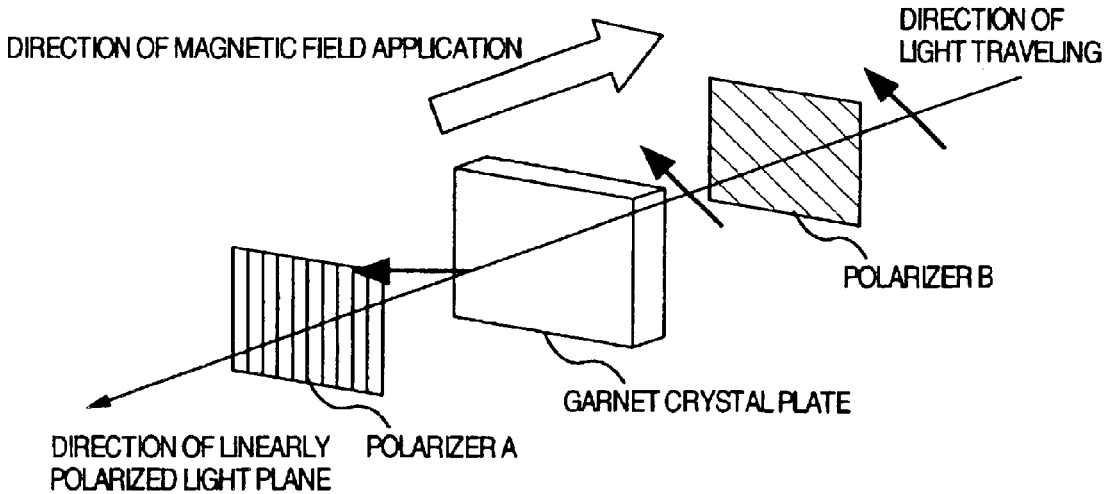

FIGS. 11A and 11B are diagrams showing how a polarization angle of certain linearly polarized light is changed by the Faraday rotator. A combination of a polarizer A, a Faraday rotator, a polarizer B, and a magnet shown in FIGS. 11A and 11B is an isolator. The isolator is an apparatus for removing harmful return reflected light caused at a connection portion of optical connection. According to the Faraday effect, such a property that the polarized wave direction of light rotates (optical rotary power) is obtained. Unlike the ordinary optical rotary power (natural optical rotary power), however, reversing the traveling direction of light does not restore the original state, but further rotates the polarized wave direction in the Faraday effect. Hereafter, this will be described concretely with reference to FIG. 1.

In the case of forward traveling light, linearly polarized light input to the polarizer A in the same polarization direction as the polarizer A is rotated in polarization direction by 45 degrees by the function of the Faraday rotator, and passed through the polarizer B having a direction of 45 degrees. In the case of backward traveling light, linearly polarized light reflected and returned is passed through the polarizer B and thereafter rotated by 45 degrees in the same direction again by the Faraday rotator, and consequently it cannot pass through the polarizer A. In other words, harmful reflected and returned light can be removed.

In the half-wave plate as well, it is possible to rotate the polarization direction of the linearly polarized light by 45 degrees. Supposing that a half-wave plate for rotating linearly polarized light in the same direction as the Faraday rotator is disposed, the half-wave plate rotates the linearly polarized light that is backward traveling light, in a direction opposite to the original rotation direction. Resultant light is passed through the polarizer A.

In FIGS. 11A and 11B, a garnet crystal plate is used as the Faraday rotator with such a plate thickness and an applied magnetic field that the Faraday rotation angle becomes 45 degrees.

In FIG. 1, an incident beam aligned in polarization state with S-polarized light ((i)) is input to the PBS 1. The S-polarized light is reflected by a PBS plane of the PBS 1 toward the cross prism 5, and input to the Faraday rotator 2. Linearly polarized light ((ii)) obtained by rotating the S-polarized light by 45 degrees in the Faraday rotator 2 is then further rotated by 45 degrees in the half-wave plate 3 to become P-polarized light ((iii)). White light with P-polarization incident on the cross prism 5 is separated into three colors R, G and B by the dichroic function of the cross prism 5, and R, G and B beams are reflected respectively by the reflection type liquid crystal panels 6 corresponding to respective colors. Each reflection type liquid crystal panel 6 is driven by a drive circuit, which is not illustrated, on the basis of an input video signal. Each reflection type liquid crystal panel 6 is provided with a function of reflecting an ON beam while keeping the polarization state at P-polarized light, and converting the polarization state from P-polarized light to S-polarized light for an OFF beam. This function becomes opposite to the case of the reflection type liquid crystal panel 12. However, it can be coped with by applying white-black inversion to drive of the reflection type liquid crystal panels 6 shown in FIG. 12.

Subsequently, beams reflected by the reflection type liquid crystal panels 6 are subjected to color synthesis in the cross prism 5, and input to the half-wave plate 3. In the case of an ON beam, P-polarized light ((iv)) is input to the half-wave plate 3, and consequently it becomes linearly polarized light ((v)) in the direction of 45 degrees that is the same as the original direction, and it is input to the Faraday rotator 2. In the Faraday rotator 2, the beam is rotated by 45 degrees in the same direction again, and resultant P-polarized light ((vi)) is transmitted through the PBS 1. On the other hand, in the case of an OFF beam, S-polarized light ((iv)) is input to the half-wave plate 3, and consequently it becomes linearly polarized light ((v)) in the direction of 45 degrees that is opposite to the original direction (a direction perpendicular to the direction of the case of the ON beam at 90 degrees), and it is input to the Faraday rotator 2. In the Faraday rotator 2, the beam is rotated by 45 degrees in the same direction again, and S-polarized light ((vi)) is restored and consequently it is reflected by the PBS 1.

The polarization directions of (i), (ii), (iii), (iv), (v) and (vi) shown in FIG. 1 will now be described in detail with reference to FIGS. 2A and 2B. In FIGS. 2A and 2B, polarization axes of an incidence system are indicated by coordinates seen from an incidence side, and polarization axes of a reflection system are indicated by coordinates seen from an emission side. In other words, the coordinate system of the incidence system becomes the same as that of the emission system. As for definition of the S-polarized light and P-polarized light, polarized light polarized in parallel to a plane of incidence defined by a plane formed by a direction of propagation of incidence light and a normal line of a boundary plane is P-polarized light, and polarized light polarized at right angles to the plane of incidence is S-polarized light. In FIGS. 2A and 2B, S-polarized light and P-polarized light are indicated by arrows of polarization directions of the S-polarized light and P-polarized light, respectively.

The incident S-polarized light ((i)) is rotated by 45 degrees counterclockwise ((ii)) by the Faraday rotator 2. Subsequently, the linearly polarized light in a leftward rising direction of 45 degrees shown in FIG. 2A is folded back around a polarization axis of the half-wave plate 3 having an angle of 22.5 degrees clockwise with respect to a horizontal axis (X-axis) shown in FIG. 2A to become the P-polarized light ((iii)). Subsequently, the P-polarized light ((iv)) that is an ON beam reflected by the reflection type liquid crystal panels 6 is folded back around the polarization axis of the half-wave plate 3 having the angle of 22.5 degrees clockwise with respect to the horizontal axis (X-axis) shown in FIG. 2A to become the linearly polarized light ((v)) in a leftward rising direction of 45 degrees as shown in FIG. 2B. Finally, in the Faraday rotator 2, the linearly polarized light is rotated to the same direction as the original direction, i.e., by 45 degrees counterclockwise to become the P-polarized light ((vi)).

Figure 4:
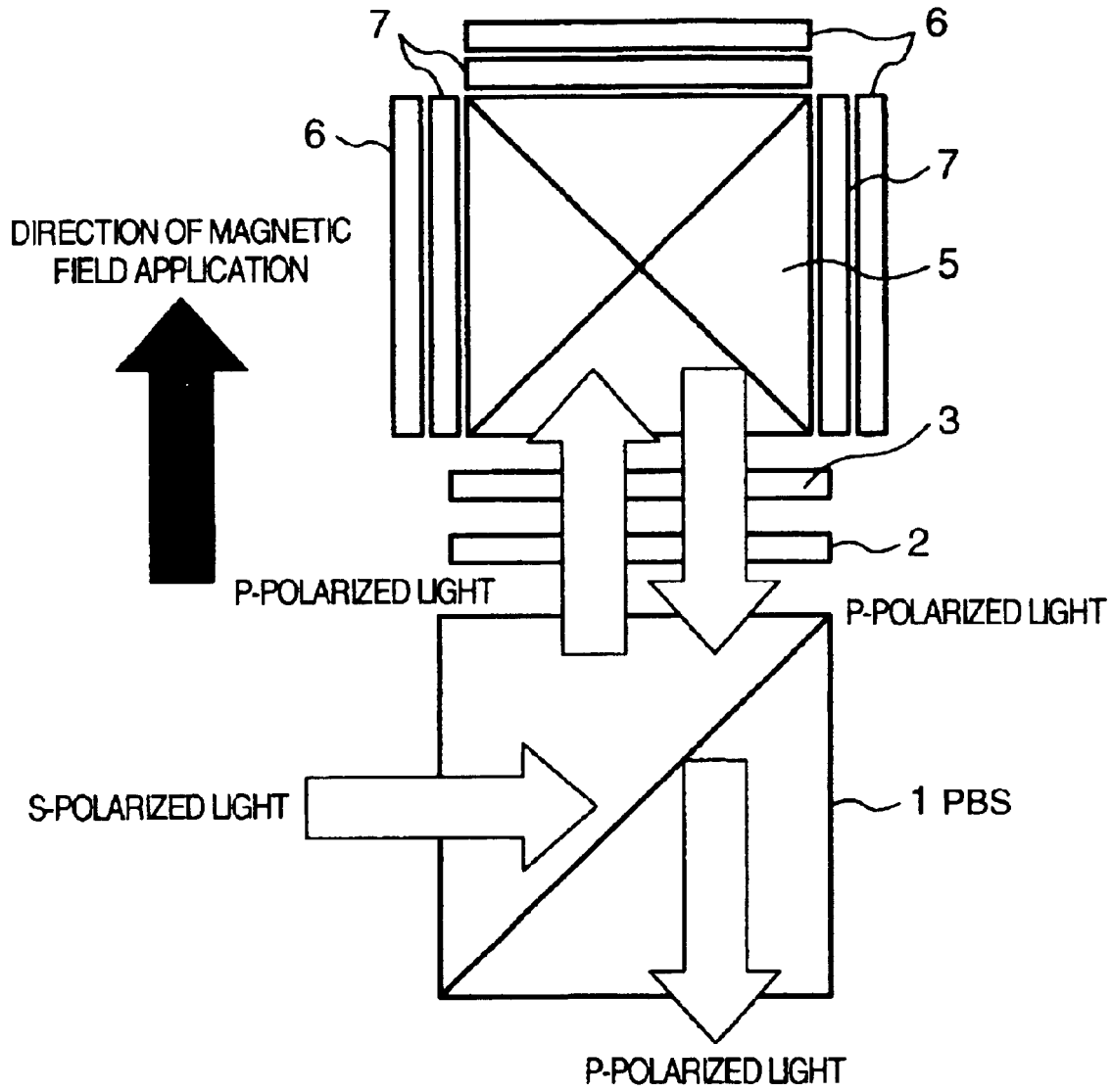
FIG. 4 is a configuration diagram of a color separation and synthesis section having a sheet polarizer on each of optical paths between a cross prism and reflection type liquid crystal panels in a first embodiment of the present invention.
Figure 12:
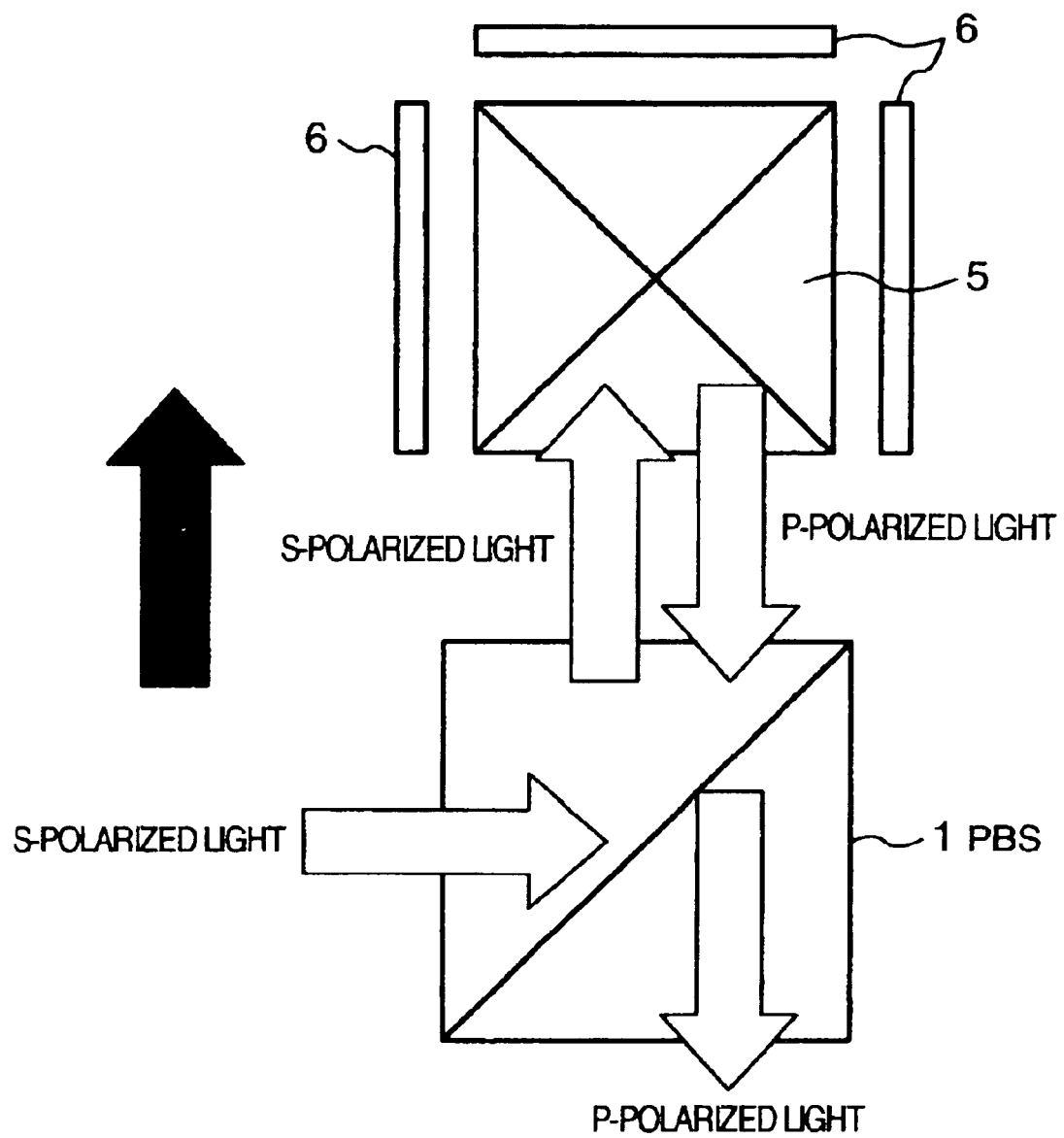
FIG. 12 is a configuration diagram showing polarization states of a color separation and synthesis section in a reflection type liquid crystal panel using a cross prism.

Although not illustrated, the S-polarized light that is an OFF beam reflected by the reflection type liquid crystal panels 6 is folded back around the polarization axis of the half-wave plate 3 having the angle of 22.5 degrees clockwise with respect to the horizontal axis (X-axis) shown in FIG. 2A to become linearly polarized light in a rightward rising direction of 45 degrees in FIG. 2B, which is opposite to the original state. Finally, in the Faraday rotator 2, the linearly polarized light is rotated to the same direction as the original direction, i.e., by 45 degrees counterclockwise to become the S-polarized light. Typically, the cross prism 5 is designed giving priority to the priority states (P-polarized light) of the incident beam and the reflected ON beam. Therefore, a part of the reflected OFF beam does not return to the PBS 1. For example, a part of the reflected OFF beam arrives at opposed reflection type liquid crystal panels 6. FIG. 4 is a configuration diagram of a configuration obtained by disposing a sheet polarizer 7, which passes only the polarization direction of the incident beam and the reflected ON beam, on each of optical paths between the cross prism 5 and the reflection type liquid crystal panels 6 in the configuration shown in FIG. 1. Even in the case where the spectral transmittance performance of the cross dichroic prism 5 is not fine, it becomes possible in FIG. 4 to easily absorb reflected OFF beams differing in polarization state with the sheet polarizer, by disposing the sheet polarizer 7, which passes only the polarization direction of the incident beam and the reflected ON beam, on each of the optical paths between the cross prism 5 and the reflection type liquid crystal panels 6. On the other hand, in the case of the configuration as shown in FIG. 12, the polarization state of the incident beam differs from the polarization state of the reflected ON beam, and consequently it is not possible to dispose a sheet polarizer on each of optical paths between the cross prism 5 and the reflection type liquid crystal panels 6.

The rotation angle of the polarization axis effected by the half-wave plate 3 may not be 45 degrees but may be 135 degrees. If in this case the polarization axis of the half-wave plate 3 shown in FIGS. 2A and 2B is rotated by 90 degrees, then it is possible to further rotate the polarization direction of linearly polarized light by twice as great as 90 degrees, i.e., 180 degrees. It is a matter of course that an equivalent effect can be obtained, for example, even if two quarter-wave plates having the same polarization axis are provided.

Instead of the configuration in which the beam aligned with S-polarized light is first input to the PBS 1, a configuration in which a beam aligned with P-polarized light is input to the PBS 1 may also be adopted. In that case, the angle of the polarization axis of the half-wave plate 3 should be changed according to the state of polarized light incident on the cross prism 5. In the same way, the beam first incident on the the cross prism 5 may not be P-polarized light, but may be S-polarized light. In that case as well, the angle of the polarization axis of the half-wave plate 3 should be changed.

As for the rotation angle caused by the Faraday rotator 2, it is only necessary in the same way that S-polarized light and P-polarized light are interchanged after passage in two round trips, and consequently the rotation angle should be 45 degrees or 135 degrees, i.e., half of 90 degrees or half of 270 degrees. This case should be also coped optimally with the polarization angle of the half-wave plate 3 corresponding to the rotation angle.

The general configuration of the optical system of the projection type projector apparatus using the color separation and synthesis section will now be described with reference to FIG. 3.

In FIG. 3, reference numeral 11 denotes a light source, 12 a concave mirror, 13 an integrator, 14 a polarization conversion element, 15 an image forming lens, 16 a reflecting mirror, 17 a field lens, and 18 a projection lens. Reference numerals 1 to 6 denote the same components as those shown in FIG. 1. By forming the concave mirror 12 in a paraboloidal form and disposing the light source 11 in a position of a focal point of the paraboloid, light from the light source is reflected by the concave mirror 12 to become a beam parallel to the optical axis. By the integrator 13 formed of two sets of multi-lens arrays each including lenses arranged in a two-dimensional form, light from the light source is converted to a plurality of secondary light source images. Natural light is separated into P-polarized light and S-polarized light by the polarization conversion element 14 disposed immediately after the integrator 13, and then the polarization state is aligned with S-polarized state. The secondary light source images that have become S-polarized light are led to the reflection type liquid crystal panels 6 by the image forming lens 15 and the field lens 17. To be concrete, light quantity distributions of respective lenses on the first multi-lens array plane are superposed on planes of the reflection type liquid crystal panels 6. In FIG. 3, two lenses, i.e., the image forming lens 15 and the field lens 17 are used, and the image forming lens 15 bears mainly the image forming function whereas the field lens 17 bears mainly the function of making the principal beam incident on the reflection type liquid crystal panels 6 telecentric. However, the number of lenses may be three, or conversely it is also possible that one lens bear the functions. Furthermore, in FIG. 3, the mirror 16 is disposed on the way to bend the optical path and the whole apparatus can be made compact. The mirror 16 may be provided with a function of transmitting ultraviolet rays and infrared rays harmful to the reflection type liquid crystal panels 6 and reflecting only a visible ray. As for ultraviolet rays, it is also effective to further dispose an ultraviolet ray absorbing filter on an optical path in the middle.

In the first embodiment, it is supposed that the PBS 1 has such a characteristic to white light as to reflect S-polarized light and transmit P-polarized light. However, it is also possible to design the characteristics of the PBS 1 so as to reflect S-polarized light and transmit P-polarized light for the G beam and transmit P-polarized light and reflect S-polarized light for the R beam and B beam, and change only the polarization states of a specific color in the rotator before incidence on the PBS 1 and thereby first input the G beam to the PBS 1 as S-polarized light and the R beam and the B beam to the PBS 1 as the P-polarized light. In this case, polarization states of respective colors of the cross prism 5 can be divided into P-polarized light for the G beam and S-polarized light for the R beam and B beam at the time of incidence and ON reflection, and consequently the performance of the cross prism 5 can be improved.

Figure 5:
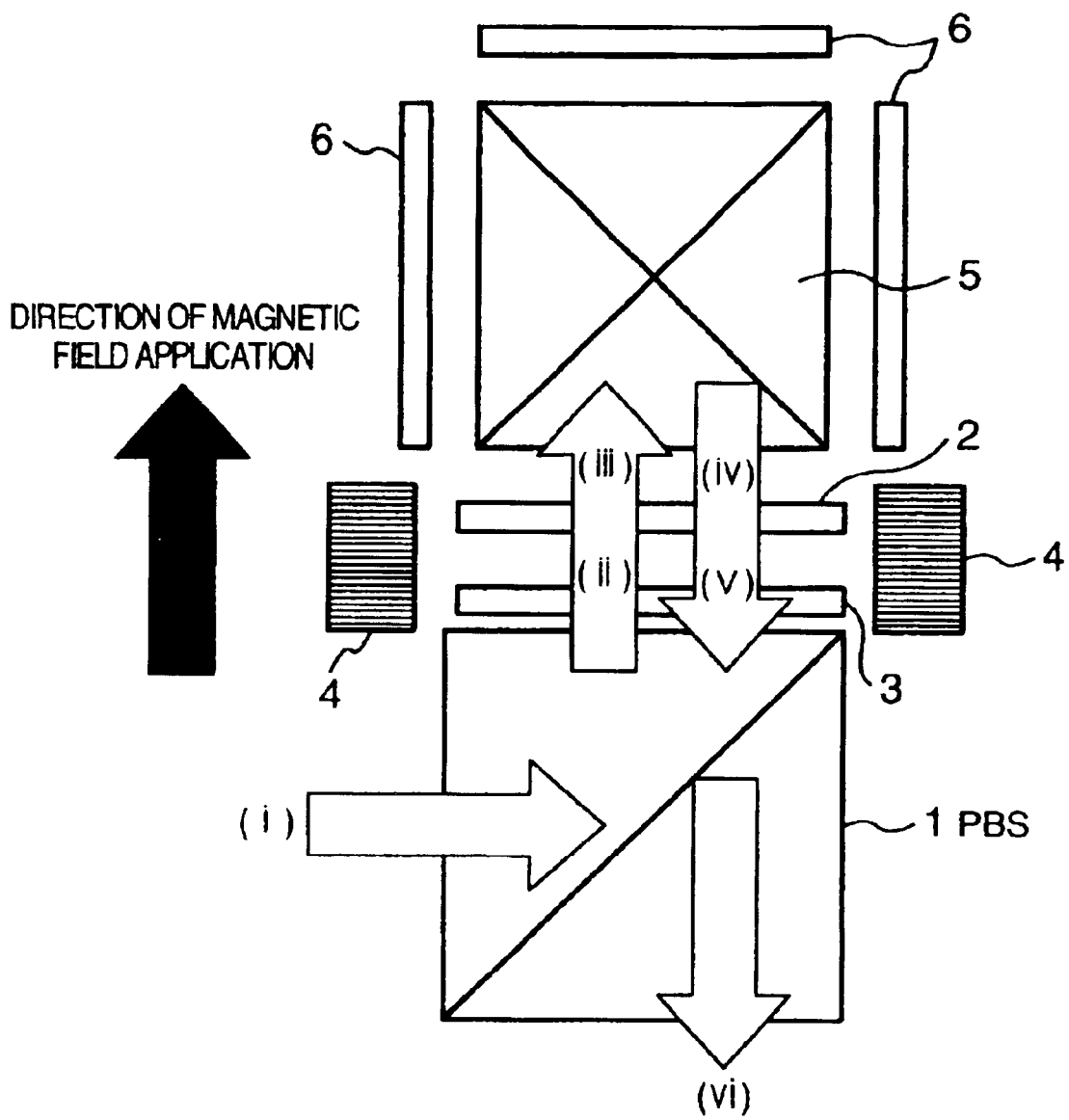
FIG. 5 is a configuration diagram of a color separation and synthesis section in a second embodiment of the present invention.
Figure 6A:
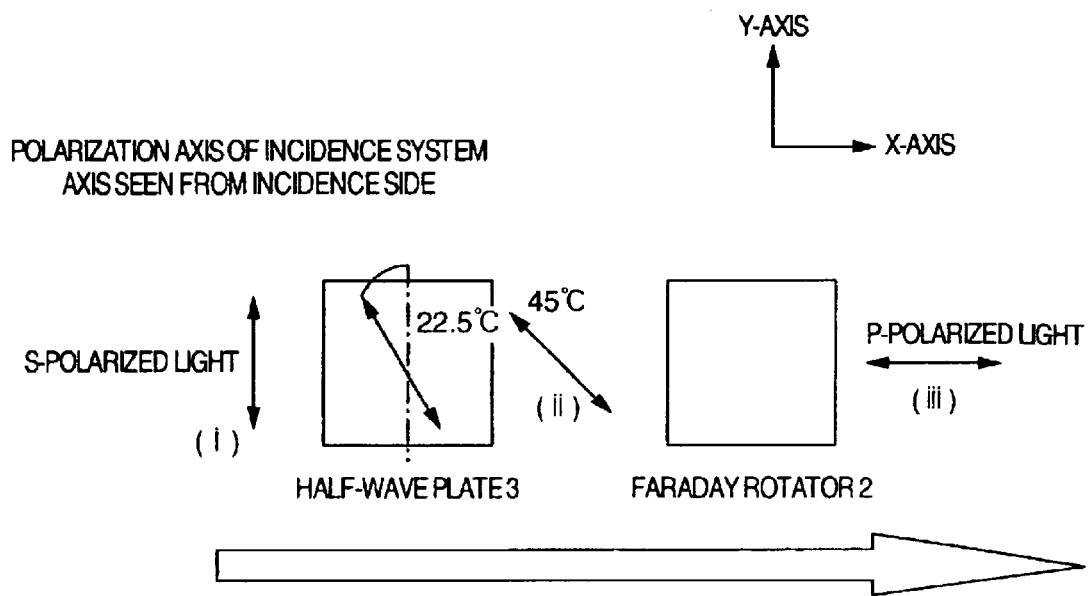
FIGS. 6A and 6B are diagrams of a polarization axis of a color separation and synthesis section in a second embodiment of the present invention.

A second embodiment of the present invention will now be described with reference to FIGS. 5 and 6. FIG. 5 is a basic configuration diagram of a color separation and synthesis section of a projection type projector apparatus. FIGS. 6A and 6B are diagrams showing details of beam polarization states.

In FIG. 5, an incident beam aligned in polarization state with S-polarized light ((i)) is input to the PBS 1. The S-polarized light is reflected by the PBS plane of the PBS 1 toward the cross prism 5, and input to the half-wave plate 3. Linearly polarized light ((ii)) obtained by rotating the linearly polarized light by 45 degrees in the half-wave plate 3 is then further rotated by 45 degrees in the Faraday rotator 2 to become P-polarized light ((iii)). White light with P-polarization incident on the cross prism 5 is separated into three colors R, G and B by the dichroic function of the cross prism 5, and R, G and B beams are reflected respectively by the reflection type liquid crystal panels 6 corresponding to respective colors. Each reflection type liquid crystal panel 6 is provided with a function of reflecting an ON beam while keeping the polarization state at P-polarized light, and converting the polarization state from P-polarized light to S-polarized light for an OFF beam.

Subsequently, beams reflected by the reflection type liquid crystal panels 6 are subjected to color synthesis in the cross prism 5, and input to the Faraday rotator 2. In the case of an ON beam, P-polarized light ((iv)) is input to the Faraday rotator 2 and rotated by 45 degrees in the same direction again, and consequently it becomes linearly polarized light ((v)) in the direction of 45 degrees that is opposite to the original direction, and it is input to the half-wave plate 3. The linearly polarized light is folded back around a polarization axis of the half-wave plate 3. Resultant P-polarized light ((vi)) is transmitted through the PBS 1. On the other hand, in the case of an OFF beam, S-polarized light ((iv)) is input to the Faraday rotator 2 and rotated by 45 degrees in the same direction again, and consequently it becomes linearly polarized light in the direction of 45 degrees that is the same as the original direction (a direction perpendicular to the direction of the case of the ON beam at 90 degrees), and it is input to the half-wave plate 3. In the half-wave plate 3, therefore, the beam is restored to the S-polarized light ((vi)), which is the same as the original polarized light, and consequently it is reflected by the PBS 1.

The polarization directions of (i), (ii), (iii), (iv), (v) and (vi) shown in FIG. 5 will now be described in detail with reference to FIGS. 6A and 6B. In FIGS. 6A and 6B, polarization axes of an incidence system are indicated by coordinates seen from an incidence side, and polarization axes of a reflection system are indicated by coordinates seen from an emission side. In other words, the coordinate system of the incidence system becomes the same as that of the emission system. The incident S-polarized light ((i)) is folded back around the polarization axis of the half-wave plate 3 having an angle of 22.5 degrees counterclockwise with respect to a vertical axis (Y-axis) shown in FIG. 6A to become the linearly polarized light ((ii)) in a leftward rising direction of 45 degrees as shown in FIG. 6A. Subsequently, the linearly polarized light is rotated by 45 degrees counterclockwise by the Faraday rotator 2 to become the P-polarized light ((iii)). The Faraday rotator 2 rotates linearly polarized light in the same direction as the original state, i.e., by 45 degrees counterclockwise. Therefore, the P-polarized light ((iv)) that is an ON beam reflected by the reflection type liquid crystal panels 6 is rotated to become linearly polarized light ((v)) in a rightward rising direction of 45 degrees as shown in FIG. 6B. The linearly polarized light ((v)) is input to the half-wave plate 3 and folded back around the polarization axis of the half-wave plate 3 having the angle of 22.5 degrees counterclockwise with respect to the vertical axis (Y-axis) shown in FIG. 6A to become the P-polarized light ((vi))

Figure 6B:
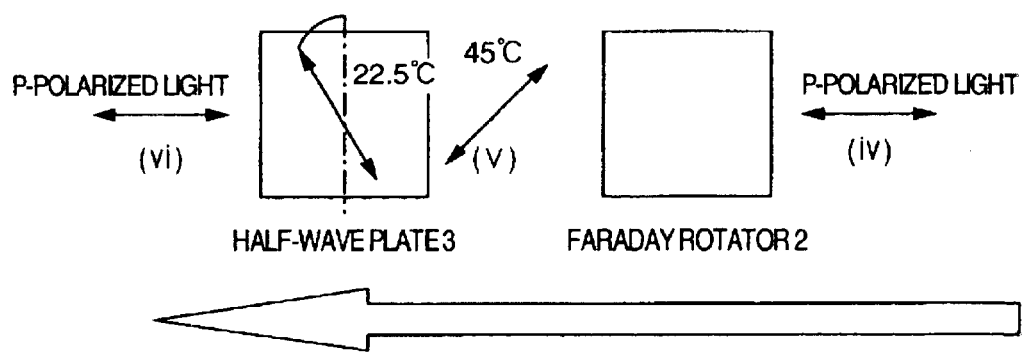

Although not illustrated, the S-polarized light that is an OFF beam reflected by the reflection type liquid crystal panels 6 is rotated by the Faraday rotator 2, which rotates linearly polarized light in the same direction as the original state, i.e., by 45 degrees counterclockwise, to become linearly polarized light in a leftward rising direction of 45 degrees in FIG. 6B. The resultant linearly polarized light is folded back around the polarization axis of the half-wave plate 3 having the angle of 22.5 degrees counterclockwise with respect to the vertical axis (Y-axis) shown in FIG. 6A to become S-polarized light.

Figure 7:
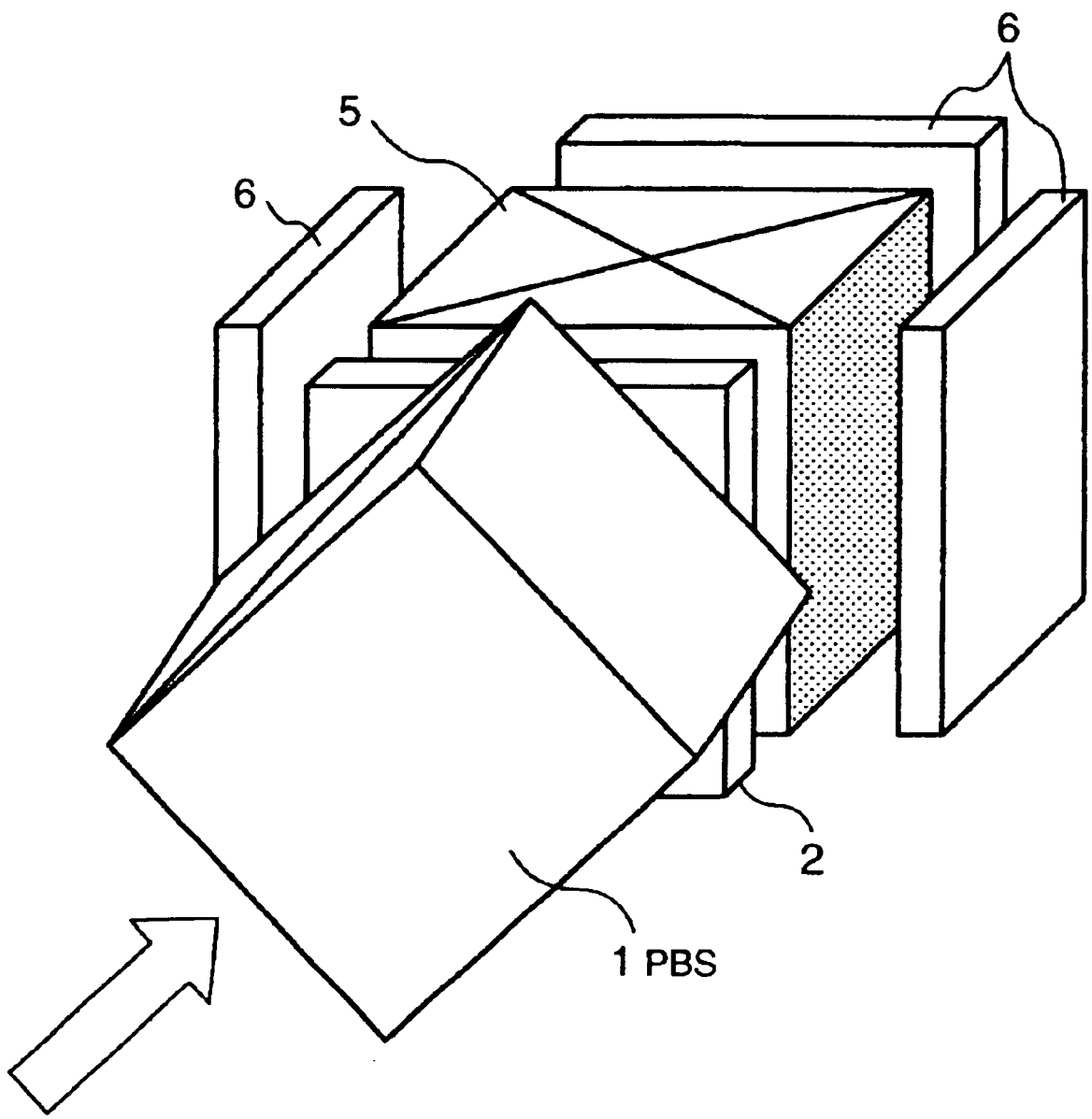
FIG. 7 is a configuration diagram of a color separation and synthesis section in a third embodiment of the present invention using an oblique view.
Figure 8:
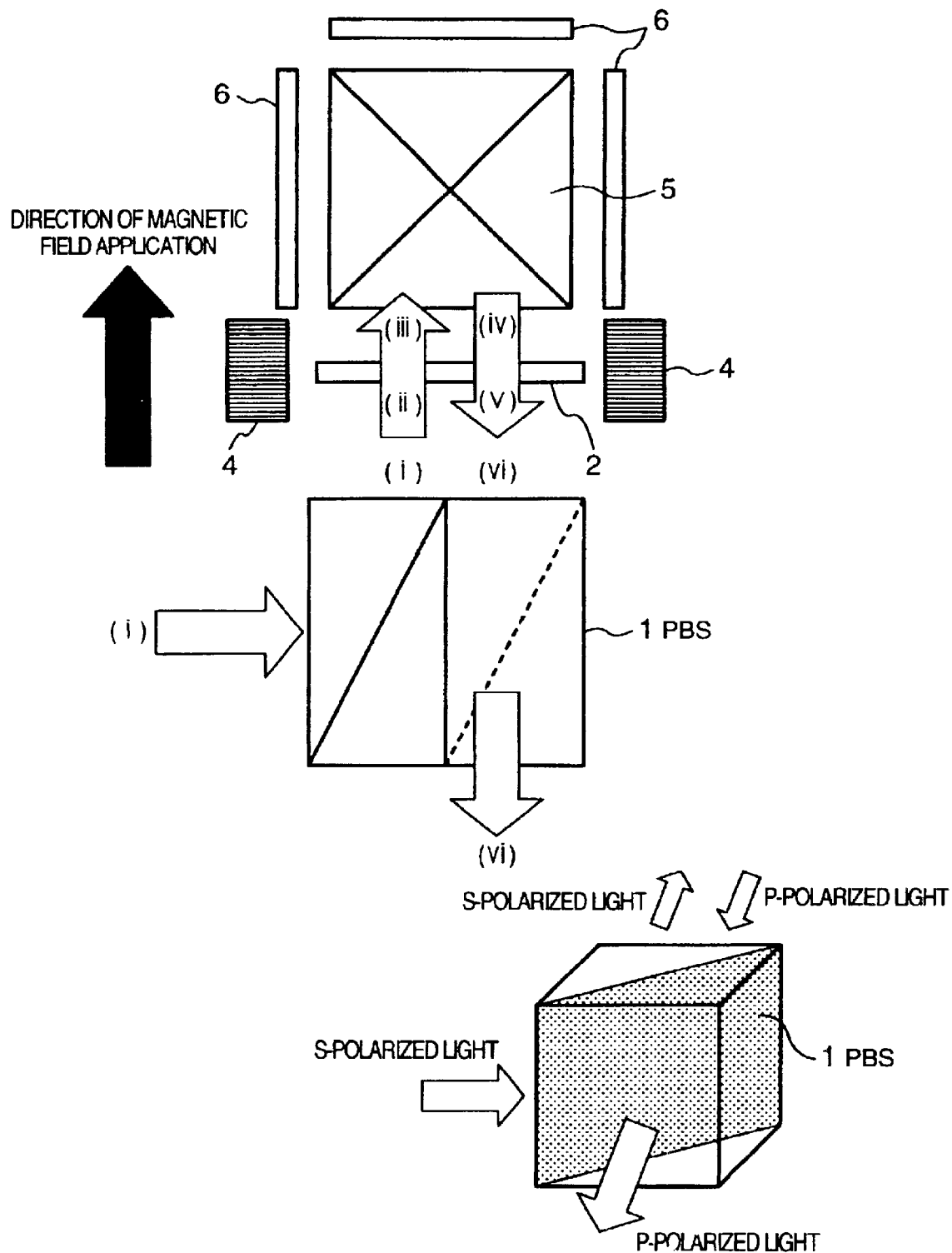
FIG. 8 is a configuration diagram of a color separation and synthesis section in a third embodiment of the present invention.
Figure 9A:
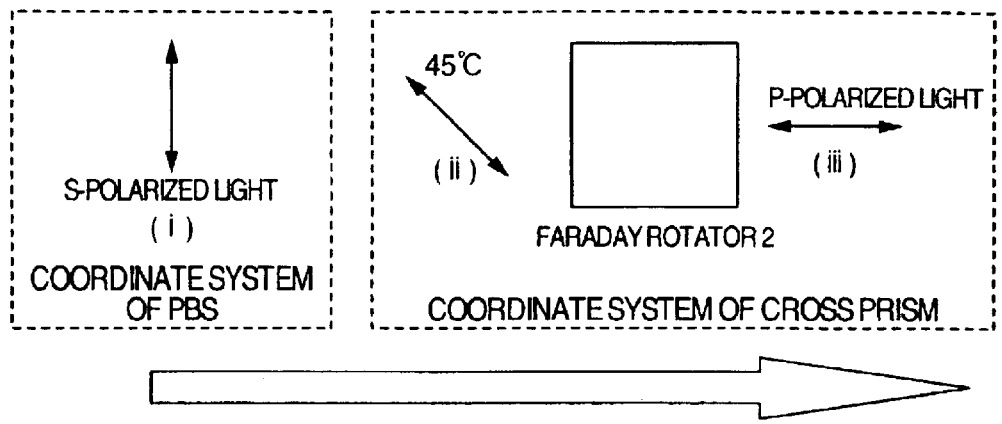
FIGS. 9A and 9B are diagrams of a polarization axis of a color separation and synthesis section in a third embodiment of the present invention.
Figure 9B:
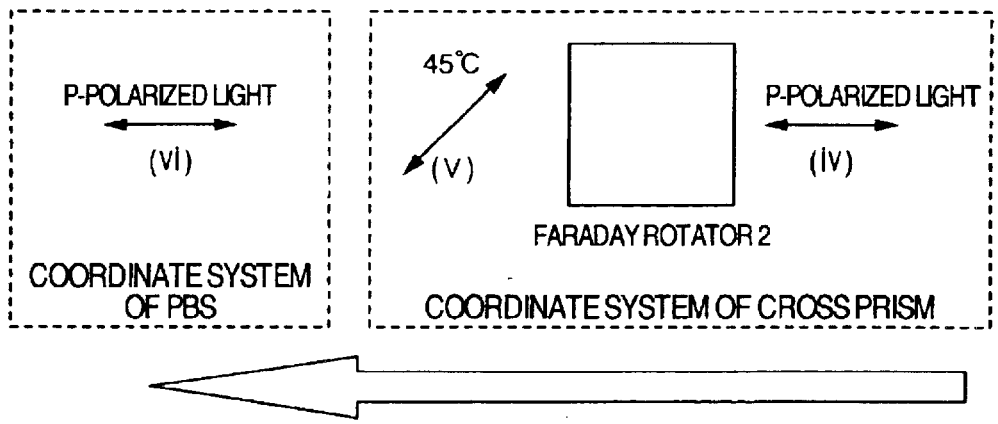

A third embodiment of the present invention will now be described with reference to FIGS. 7 to 10. FIGS. 7 and 8 are basic configuration diagrams of a color separation and synthesis section of a projection type projector apparatus. FIGS. 9A and 9B are diagrams showing details of beam polarization states. FIG. 10 is a diagram showing an action of a half-wave plate in a third embodiment of the present invention.

A great difference of the third embodiment from the first embodiment shown in FIG. 1 and the second embodiment shown in FIG. 4 is in that the PBS 1 is rotated by 45 degrees as shown in FIG. 7.

S-polarized light for the PBS 1 is inputted to the PBS 1, reflected by the PBS plane, and input toward the cross prism 5.

In FIG. 8, an incident beam aligned in polarization state for the PBS 1 with S-polarized light ((i)) is input to the PBS 1. The S-polarized light is reflected by the PBS plane of the PBS 1 toward the cross prism 5. However, the normal line direction of the cross prism 5 and the normal line direction of the PBS 1 are related to each other by a rotation of 45 degrees. Therefore, S-polarized light for the PBS 1 becomes linearly polarized light in the direction of 45 degrees for the cross prism 5. The linearly polarized light in the direction of 45 degrees is rotated by 45 degrees in the Faraday rotator 2 to become P-polarized light ((iii)). White light with P-polarization incident on the cross prism 5 is separated into three colors R, G and B by the dichroic function of the cross prism 5, and R, G and B beams are reflected respectively by the reflection type liquid crystal panels 6 corresponding to respective colors. Each reflection type liquid crystal panel 6 is provided with a function of reflecting an ON beam while keeping the polarization state at P-polarized light, and converting the polarization state from P-polarized light to S-polarized light for an OFF beam.

Subsequently, beams reflected by the reflection type liquid crystal panels 6 are subjected to color synthesis in the cross prism 5, and input to the Faraday rotator 2. In the case of an ON beam, P-polarized light ((iv)) is input to the Faraday rotator 2 and rotated by 45 degrees in the same direction again, and consequently it becomes linearly polarized light ((v)) in the direction of 45 degrees that is opposite to the original direction. The linearly polarized light in the direction of 45 degrees that is opposite to the original direction becomes P-polarized light ((vi)) for the PBS 1, and it is transmitted through the PBS 1. On the other hand, in the case of an OFF beam, S-polarized light ((iv)) is input to the Faraday rotator 2 and rotated by 45 degrees in the same direction again, and consequently it becomes linearly polarized light in the direction of 45 degrees that is the same as the incident beam. For the PBS 1, the linearly polarized light is restored to S-polarized light ((vi)), which is the same as the original polarized light, and consequently it is reflected by the PBS 1.

The polarization directions of (i), (ii), (iii), (iv), (v) and (vi) shown in FIG. 8 will now be described in detail with reference to FIGS. 9A and 9B. In FIGS. 9A and 9B, polarization axes of an incidence system are indicated by coordinates seen from an incidence side, and polarization axes of a reflection system are indicated by coordinates seen from an emission side. In other words, the coordinate system of the incidence system becomes the same as that of the emission system. Since the normal line direction of the PBS 1 is displaced from the normal line direction of the cross prism 5 by 45 degrees, the S-polarized light ((i)) incident on the PBS 1 becomes linearly polarized light ((ii)) in a leftward rising direction of 45 degrees as shown in FIG. 9A for the cross prism 5. Subsequently, the linearly polarized light is rotated by 45 degrees counterclockwise by the Faraday rotator 2 to become the P-polarized light ((iii)). Subsequently, the P-polarized light ((iv)) that is an ON beam reflected by the reflection type liquid crystal panels 6 is rotated by the Faraday rotator 2, which rotates linearly polarized light in the same direction as the original state, i.e., by 45 degrees counterclockwise, to become linearly polarized light ((v)) in a rightward rising direction of 45 degrees in FIG. 9B. In the same way, since the normal line direction of the PBS 1 is displaced from the normal line direction of the cross prism 5 by 45 degrees, P-polarized light ((vi)) for the PBS 1 is obtained.

Although not illustrated, the S-polarized light that is an OFF beam reflected by the reflection type liquid crystal panels 6 is rotated by the Faraday rotator 2, which rotates linearly polarized light in the same direction as the original state, i.e., by 45 degrees counterclockwise, to become linearly polarized light in a leftward rising direction of 45 degrees. In the same way, since the normal line direction of the PBS 1 is displaced from the normal line direction of the cross prism 5 by 45 degrees, S-polarized light for the PBS 1 is obtained.

S-polarized light for the PBS 1 will now be described with reference to FIG. 10. FIG. 10 is a diagram showing relations among the polarization direction in the polarization conversion element 14, the polarization direction in the PBS 1, and the polarization direction in the cross prism 5.

In order to superpose light quantity distributions of respective lens surfaces included in the integrator 13 on the reflection type liquid crystal panels 6, optical mapping relations between the polarization conversion element 14 and the reflection type liquid crystal panels 6 must be maintained. Therefore, the polarization direction of the polarization conversion element 14 and the polarization direction of the cross prism 5 also become the same. On the other hand, since there is a difference of 45 degrees between the polarization direction of the cross prism 5 and the polarization direction of the PBS 1, there is also a difference of 45 degrees between the polarization direction of the polarization conversion element 14 and the polarization direction of the PBS 1. In the third embodiment of the present invention, therefore, it is necessary to dispose a half-wave plate for rotating the polarization direction of linearly polarized light by 45 degrees and generating S-polarized light for the PBS 1, on the optical path between the polarization conversion element 14 and the PBS 1.

According to the present invention, the polarization state before incidence on reflection type liquid crystal panels and the polarization state of the ON beam after the reflection effected by the reflection type liquid crystal panels are made the same in a configuration using a cross prism having a dichroic function, as heretofore described. As a result, a small-sized, lightweight, low cost illumination apparatus and a projection type projector apparatus using such an illumination apparatus can be obtained.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An optical unit comprising:

a light source;

a polarization beam splitter;

a color separation and synthesis unit having a dichroic function;

reflection type liquid crystal panels;

wherein said optical unit further includes a first optical element in an optical path between said beam splitter and said color separation and synthesis unit for rotating polarization direction of light flux to a first predetermined angle toward traveling direction of the light; and a second optical element for rotating said polarization direction of said light flux to a second predetermined angle independent of said traveling direction of the light.

2. An optical unit according to claim 1;

wherein said second optical element comprises a Faraday rotator and said color separation and synthesis unit comprises a cross dichroic prism.

3. An optical unit according to claim 1;

wherein said first optical element comprises a polarization direction rotating optical element having a function equivalent to a half-wave plate or quarter-wave plates, and said second optical element is a Faraday rotator.

4. An optical unit according to claim 1;
wherein said first optical element is disposed in an optical path between said second optical element and said color separation synthesis unit.

5. An optical unit according to claim 1;
wherein said second optical element is disposed in an optical path between said first optical element and said color separation synthesis unit.

6. An optical unit according to claim 1;
wherein said first and second predetermined angle are substantially the same angle.

7. An optical unit according to claim 6;
wherein said first and second predetermined angle is substantially 45 degrees or 135 degrees.

8. A projection type display apparatus comprising:
alight source;
a polarization beam splitter;
a color separation and synthesis unit having a dichroic function;
reflection type liquid crystal panels;
a first optical element in an optical path between said beam splitter and said color separation and synthesis unit for rotating polarization direction of light flux to a first predetermined angle toward traveling direction of the light;
a second optical element for rotating said polarization direction of said light flux to a second predetermined angle independent of said traveling direction of the light;
a drive circuit for driving said reflection type liquid crystal panel in accordance with an image signal; and
a projection lens for extending projecting optical image from said reflection type liquid crystal panel inputted through said polarizing beam splitter.

9. An optical unit according to claim 8;
wherein said first optical element comprises a polarization direction rotating optical element having a function equivalent to a half-wave plate or quarter-wave plates, and said second optical element is a Faraday rotator.

10. An optical unit according to claim 8;
wherein said first and second predetermined angle are substantially the same angle.

11. An optical unit according to claim 6;
wherein said first and second predetermined angle is substantially 45 degrees or 135 degrees.

* * * * *